MARK HATTAN
INVENTOR.
BY William P. Green
ATTORNEY

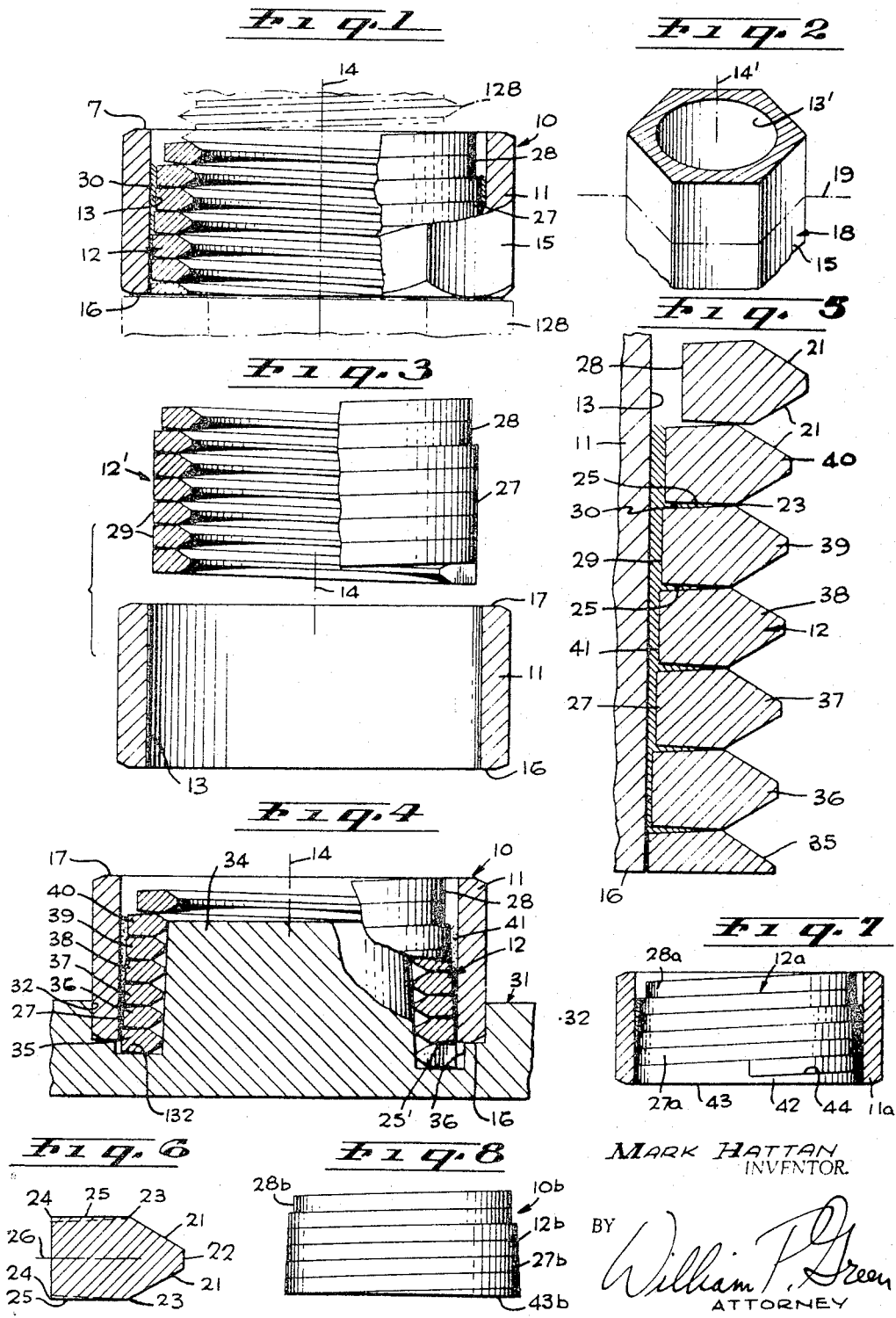

United States Patent Office 3,272,250
Patented Sept. 13, 1966

3,272,250
SELF-LOCKING NUT
Mark Hattan, Pasadena, Calif., assignor of sixteen percent to William P. Green, Pasadena, Calif.
Filed June 15, 1965, Ser. No. 464,160
9 Claims. (Cl. 151—21)

The present application is a continuation-in-part of my copending application Serial No. 319,153, filed Oct. 28, 1963, entitled Nut Having Self Locking Action, which is now abandoned and my copending application Serial No. 330,445, filed Dec. 13, 1963, entitled Method Of Forming Lock Nut.

This invention relates to an improved type of self-locking threaded element, preferably a self-locking nut, for mating with a coating second threaded part, such as a screw, stud or other externally threaded part, in a manner frictionally securing or locking the parts against unwanted separation. A primary object of the invention is to provide a low cost self-locking element which is capable of retaining its locking characteristics after a large number of uses, with no substantial decrease in the locking effectiveness as a result of such uses, while at the same time avoiding the necessity for complexity of construction in attaining these results.

A device embodying the invention includes as a primary thread element an elongated member which is coiled helically in a manner forming a corresponding helical thread for engagement with the coacting screw or other part. A first portion of the helical element is permanently bonded in a condition in which it has an essentially rigidly fixed diameter, specifically by bonding successive turns of this portion to one another and/or to an outer case. These bonded turns will then take the primary load forces imposed upon the device in use, while another portion of the same coiled element remains relatively free for resilient deformation and functions as a self-locking portion of the unit. This second portion tends to resiliently return to a normal condition in which it does not form precisely a true helical continuation of the main load carrying portion of the element, but rather affords an interference fit with a coacting screw so that it must be distorted against its own resilience upon contact with that coacting part, and therefore allows for the desired self locking action. Preferably, the locking portion has a reduced diameter, to form a constriction through which the screw must be forced.

A major advantage of permanently bonding the main load carrying portion of the element in a fixed diameter condition resides in the fact that such bonding gives this portion of the element a hoop strength by which it can resist radial expansion or distortion upon tightening of a mating screw, so that it is unnecessary to then provide an outer case or other supporting carrier part which is strong enough to itself take all of the radial forces exerted upon the helical element when the threads are tightened. This feature enables the use in the present device of an outer case of very thin construction, or in some instances might enable the complete elimination of such an outer case.

The discussed bonding of the primary turns also has the highly important advantages of eliminating the tendency for these turns to bind on or tightly wrap and lock frictionally about a mating screw if the helical element is "pulled" onto the screw by turning force exerted against the axially leading end of the element. It was found that, if the primary turns are bonded, as discussed, the short locking portion of the coiled element, even though unbonded, may then be "pulled" onto a screw without excessive binding, as the trailing portion of the nut. This enables the use of an outer case having a straight through opening for receiving the coiled element, without the necessity for provision of two inturned force transmitting shoulders at the ends of the case, as have been required in the past where the binding tendency of a completely unbonded coiled element has required that the element be "pushed" onto a screw by such a shoulder engaging the trailing end of the element.

The bonding of the primary turns of the helical element is desirably attained by a fused metal bond, which in certain instances may be a brazed connection, and in other cases may be a welded joint, preferably electron beam welding. It is also contemplated that for some uses, it may be possible to substitute for the fused metal bond a suitable resinous plastic bonding material, such as an epoxy cement or other plastic cement.

Another object of the invention is to provide a threaded element in which a series of rigidly fixed threads are so related as to distribute the axial load forces more uniformly therebetween than is possible in conventional threaded elements. For this purpose, I find it desirable to utilize a thread which, as the thread advances axially, progressively decreases very slightly in diameter, desirably to the extent of only a few ten thousandths of an inch for each turn, to in this way overcome the usual tendency for the axially inner threads of the nut to take substantially all of the load. As will appear, such slightly differing diameters are very easy to attain in a device of the above discussed type in which a number of turns of a helically coiled element are rigidly bonded in fixed diameter positions.

The above and other features and objects of the invention will be better understood from the following detailed description of the typical embodiments illustrated in the accompanying drawings, in which:

FIG. 1 is a view, partially in axial section, showing a lock nut constructed in accordance with the invention;

FIG. 2 illustrates the manner in which the case of the nut is formed from an elongated piece of metal stock;

FIG. 3 shows the case and the coiled element as they are initially formed;

FIG. 4 represents the brazing operation;

FIG. 5 shows one side of the nut fragmentarily, in axial section;

FIG. 6 shows the initial cross sectional configuration of the thread element before it is coiled;

FIGS. 7, 8 and 9 are views similar to FIG. 1, but showing three variational forms of nuts formed in accordance with the present invention.

Figure 9:
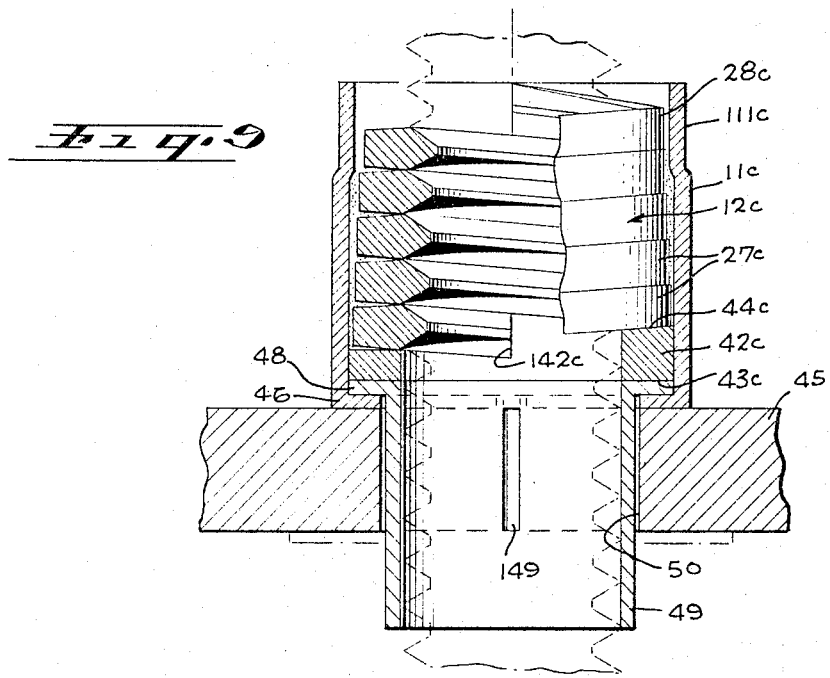

Referring first to FIG. 1, I have shown at 10 a composite nut manufactured in conformity with the present invention and including an outer case or housing 11 and an inner threaded element 12. Case 11 is essentially tubular, having a cylindrical inner surface 13 extending along its entire length, and centered about a main axis 14 of the device. Externally, case 11 has a non-circular cross sectional configuration for engagement with a wrench or other tool. For example, the outer surface 15 of casing 11 may be hexagonal as shown, or may have any other desired regular polygonal configuration, desirably continuing along the entire axial extent of the case between axially inner, and axially outer planar annular surfaces 16 and 17 which are disposed directly transversely of axis 14.

Case 11 may be formed in extremely simple manner from an elongated piece of tubular metal stock, typically steel, a portion of which is shown at 18 in FIG. 2. This stock has the external hexagonal configuration desired for outer surface 15, and has an inner surface 13' which is slightly smaller in diameter than surface 13 of FIG. 1.

A series of the cases 11 may be formed by merely cutting the stock transversely at a series of locations, in a plurality of planes 19 disposed transversely of the main axis 14' of the stock, and then reaming or honing the inner bore to a very slightly increased diameter corresponding exactly to that of the desired surface 13.

Element 12 is initially formed as an elongated wire of resilient spring material, such as stainless steel spring wire, and when first formed has the cross section illustrated in full lines in FIG. 6. More particularly this spring wire has a portion 20 at one side which is shaped to form a standard thread cross section, defined by two opposite side surfaces 21 disposed at the usual 60 degree included angle with respect to one another, and typically having the usual narrow flat surface 22 at the peak of the thread. From location 23 to 24, the initial cross section of wire 12 forms two parallel planar surfaces 25, which extend parallel to a plane 26 bisecting the thread.

After formation to this initial cross sectional configuration of FIG. 6, with that cross section continuing uniformly along the entire length of element 12, the latter is coiled essentially helically to the condition illustrated at 12' in FIG. 3. In this condition, the element 12' has a first portion 27 which is coiled precisely helically at a diameter which may correspond substantially exactly to the diameter of a screw 128 (FIG. 1) with which the nut is to mate. Portion 27 thus has a uniform diameter along its entire length, and in the arrangement of FIG. 3 is typically represented as consisting of five and one-half full turns about axis 14. Upwardly and axially outwardly beyond portion 27 of element 12', the element has a second portion 28 which is deformed in a manner such that it does not form a true helical continuation of the other turns, in order to have an interfering fit with screw 128. More particularly, portion 28 may typically consist of the upper one and one-half turns of element 12', and preferably is deformed radially inwardly, to have a substantially reduced effective thread diameter, considerably smaller than the proper size to threadedly engage screw 128. The outer surfaces 29 of portion 27 of element 12' extend cylindrically about axis 14, and are, in the FIG. 3 condition, at a diameter slightly smaller than the diameter of inner surface 13 of case 11.

The helical coiling of element 12 to the condition represented at 12' in FIG. 3 causes the radially outer portion of element 12 to be stretched in a manner such that its axial dimension reduces slightly, from the full line condition of FIG. 6 to the broken line condition represented in that figure, in which surfaces 25 have been pulled toward one another to converge as they advance radially outwardly between points 23 and 24. This convergence is brought out clearly in FIG. 5, as is the fact that, due to such convergence of surfaces 25, there are left between successive turns of the element 12 narrow flaring triangularly shaped spaces 30 within which bonding material may be subsequently received.

After formation of the case and coiled element both to the configuration shown in FIG. 3, these parts are assembled together within a suitable fixture such as that represented at 31 in FIG. 4, which fixture may have a hexagonal recess 32 (or a round recess if preferred) for receiving and locating in supported condition the case 11. Fixture 31 may also have a helical ramp surface 132 adapted to engage the lower turn of element 12 and support it in the illustrated position. Projecting upwardly within the interior of element 12, fixture 31 may have a boss or mandrel portion 34, of slightly upwardly tapering frusto-conical shape, and centered about the main axis 14 of nut 10. The outer frusto-conical surface of boss 34 is shaped to maintain the five and one-half turns of portion 27 of the coiled element in very slightly tapering condition, that is, in a condition in which the diameter of portion 27 of the coiled element 12 gradually and very slightly decreases as the element advances progressively upwardly. The lowermost turn 35 of portion 27 of the coiled element is held by fixture 31 in a position in which this turn projects downwardly beyond end surface 16 of case 11, and is supported in its downwardly projecting position by ramp surface 132 within a recess 36 in fixture 31. Stated differently, the element 12 continues downwardly beyond the point at which its undersurface 25 is aligned with undersurface 16 of the case (point 25' in FIG. 4), through an axial distance therebeyond at least as great as the axial lead between corresponding portions of successive turns of element 12. The turns 36, 37, 38, 39 and 40 gradually decrease very slightly in diameter, with each turn preferably being not more than about two full thousandths of an inch (more desirably not more than one full thousandth), smaller in diameter than the preceding one (in most instances only a few ten thousandths, and for best results between about two and five ten thousandths smaller). The uppermost full turn of initially uniform diameter portion 27 desirably is held by boss or mandrel 34 in a diameter corresponding exactly to that of a standard thread designed to mate with screw 128. The turns beneath turn 40 are thus preferably very slightly oversize, to an extent equalizing the load transmitted to these turns from a screw of uniform diameter. Boss 34 does not reach the location of the upper portion 28 of element 12, and therefore does not affect the diameter of these turns.

While the parts are held in the condition of FIG. 4, portion 27 of element 12 is rigidly and permanently bonded to case 11, by bonding material represented at 41. This bonding material may be located in the device in any suitable manner, as by application to the inner surface of case 11 prior to insertion of element 12 therein, or as by insertion of a suitable ring of bonding material in the case or about element 12. The bonding material is preferably a brazing material chosen to bond tightly to the metal casing 11 and spring metal part 12, but may also be a suitable resinous plastic cement, such as an epoxy cement or the like. Bonding material 41 adheres tightly to the inner surface 13 of case 11, and the outer surfaces 29 of portion 27 of element 12, and also flows radially inwardly into the narrow triangularly shaped spaces 30 (FIG. 5) between successive turns of the portion 27 of element 12. Engagement of these successive turns helically at the location of points 23 in FIGS. 5 and 6 prevents flow of the bonding material radially inwardly beyond these points 23, to thus prevent damage to the thread surfaces themselves. The bonding material adheres directly to all contacted surfaces of the thread element, including the surfaces 25, to permanently and rigidly secure successive turns of portion 27 of element 12 together and to case 11, and to do so in a manner retaining the turns of this portion 27 in their slightly decreasing diameter condition.

After the brazing or other bonding operation, the composite nut, including parts 11 and 12, is removed from fixture 31, and is then placed in a grinding or cutting tool which acts to remove the axially inwardly projecting portion of inner turn 35 of element 12 to the condition of FIG. 1. More particularly, the end turn of element 12 is ground off in the plane of undersurface 16 of case 11, to form a bottom transverse planar surface of element 12 which coacts with surface 16 of the case in transmitting load forces to a work piece. The prior brazing or bonding of element 12 in fixed position within the case assures positive retention of the element 12 in a manner such that the grinding operation can be performed effectively.

The slight difference in diameter between successive turns of portion 27 is substantially less than the difference in diameter between the upper self locking turns 28 and the nearest turn 40 of portion 27. For example, in a ¾—16 nut, portion 28 may be twenty thousandths of an inch smaller in diameter than upper turn 40 of portion 27, while the various successive turns of portion 27 may themselves differ only by a few ten thousandths in diameter, as previously stated.

In using the nut of FIGS. 1 through 6, after formation in the above discussed manner, the nut is screwed onto a screw 128 with the lower end of the nut as seen in FIG. 1 being its leading end. That is, the lower turn in FIG. 1 is first screwed onto the mating threaded element, and the other turns then move successively onto the screw until ultimately the top portion 28 advances onto it. This top portion 28 is substantially smaller in diameter than the threads of the screw 128 and therefore must be expanded radially outwardly against its own resilience by the screw, to thus attain a frictional lock acting to retain the screw and nut against accidental unscrewing rotation. Upper turn 40 of the portion 27 fits the screw threads precisely, while the turns therebelow are slightly oversize to overcome the usual tendency for the lowermost turn or turns to take more than their proper share of the axial load imparted by a mating screw. The difference in diameters of successive turns of portion 27 is just such as to exactly equalize the axial load forces taken by the different turns of portion 27, when they engage successive turns of a uniform diameter screw, to thus maximize the load taking characteristics of the overall nut structure.

When it is desired to remove the nut from the screw, this may be accomplished by merely exerting an increased unscrewing torque on the nut, and as soon as portion 28 of the coiled element moves out of engagement with the screw, this portion will return resiliently to its initial reduced diameter condition, in preparation for a next successive use. The nut may be screwed onto and off of the mating threaded element many times without loss of the load taking characteristics or self locking capacity.

FIG. 7 shows a variational form of nut formed in accordance with the present invention, which includes a case 11a which may correspond to case 11 of the first form, and an inner threaded element 12a which may correspond with element 12 except that its inner end, instead of being ground off, rests on a supporting ramp part 42. This ramp is formed separately from element 12a, and has a transverse inner end surface 43, lying in the same transverse plane as the inner end surface 16a of the case, and a helical ramp surface 44 which is shaped to exactly mate with and substantially engage the inner helical end surface of the end turn of element 12a. The element 12a may have a first series of turns 27a which progressively decrease very slightly in diameter, and an upper portion 28a (typically one and one-half turns) which is substantially reduced in diameter to attain the self locking action of portion 28 in the first form of the invention. The various turns of portion 27a of element 12a are brazed or otherwise bonded directly to one another and to case 11a, and ramp 42 is also brazed or otherwise bonded to the end turn of element 12a and to case 11a. Portion 28a is of course left free of any bonding attachment to the case or between successive turns of element 12a, to be free for expansion and contraction as is portion 28 of FIGS. 1 through 6. In use, the device of FIG. 7 functions in basically the same manner as the first form of the invention.

FIG. 8 shows another form of device 10b which embodies some features of the invention. This device includes a coiled spring element 12b which may be the same as element 12 of FIG. 1, but which has no outer case. The various turns of its portion 27b are brazed together by brazing material received therebetween, and with these turns held by a boss such as element 34 of FIG. 4 in slightly decreasing diameter conditions during the brazing. Upper reduced diameter portion 28b is not brazed, and acts as a self locking structure. The coiled element is initially formed to the condition of FIG. 3 then brazed while held in the condition of FIG. 4, and its end is then ground off to form an axially inner transverse work engaging surface 43b.

In FIG. 4, instead of using a slightly conical positioning boss as shown at 34, I may use an externally threaded boss or mandrel, having threads which gradually taper upwardly to hold the lower portion of the coiled element even more positively in its proper slightly tapering condition.

FIG. 9 shows a plate nut formed in accordance with the invention, and connected into an opening 50 in a plate 45 formed of sheet metal or the like. This plate nut includes a case 11c which may be formed of sheet metal, and is both internally and externally cylindrical, with a slightly reduced diameter upper portion 111c. Case 11c contains an inner thread element 12c, corresponding to element 12 of the first form of the invention except that the inner end of element 12c, instead of being ground off transversely, rests on a supporting ramp part 42c. This ramp is formed separately from element 12c, and has an inner end surface 43c lying in a plane disposed transversely of the axis of the device, and a helical ramp surface 44c which is shaped to exactly mate with and substantially engage the inner helical end surface of the end turn of element 12c. The extremity of the end turn may be received adjacent an axially extending shoulder 142c formed on the helical ramp. The element 12c may have a first series of turns 27c which progressively decreases very slightly in diameter, and an upper portion 28c (typically one and one-half turns) which is substantially reduced in diameter to attain the self locking action of portion 28 in the first form of the invention. The various turns of portion 27c of element 12c are brazed or otherwise bonded directly to one another and to case 11c, and ramp 42c is also brazed or otherwise bonded to the end turn of element 12c and to case 11c.

Portion 28c is of course left free of any bonded attachment to the case or between successive turns of element 12c, to be free for expansion and contraction as is portion 28 of FIGS. 1 through 6. At its axially inner end, case 11c may rigidly carry a tubular extension element 49, typically formed of deformable sheet metal, with this element having an out-turned flange 48 received adjacent surface 43c of the ramp element 42c, and retained by an inturned annular flange 46 formed on part 11c. The brazing material may secure flange 48 to case 11c and ramp 42c, to form an integrated overall structure. The plate nut is secured to plate or sheet 45 by positioning tubular extension element 49 in aperture 50, as shown, and then deforming the lower portion of element 49 annularly outwardly, to the broken line condition of FIG. 9, to clamp plate 45 between this deformed portion of element 49 and flange 46. Element 49 may have a radially outwardly deformed portion 149 projecting into a mating groove in the side wall of aperture 50, to key the plate nut against turning motion. In use, the thread element of FIG. 9 functions in the same manner as in the first form of the invention.

Figure 10:
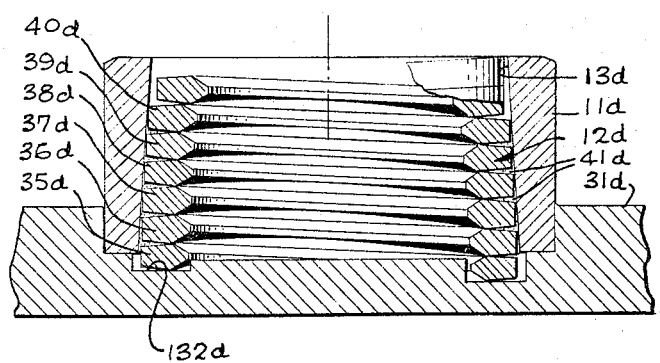
FIG. 10 is a view similar to FIG. 4, but showing a slightly variational type of outer case which itself serves the function of holding the primary turns of the nut in slightly tapering relation during the brazing operation.

FIG. 10 is a view similar to FIG. 4, but showing a variational arrangement in which, instead of utilizing a central mandrel 34 for holding the primary turns of element 12d in their slightly tapering condition during brazing, the outer case 11d is itself shaped to maintain these turns in the proper tapering relation. More particularly, case 11d of FIG. 10 has an inner surface 13d which tapers very gradually upwardly, at exactly the rate at which the turns 35 through 40 of FIG. 4 have been described as tapering, to engage the corresponding turns 35d through 40d of FIG. 10 and hold those turns in exactly the same tapering positions as in FIG. 4. In order that the case may serve this function, all of the turns 35d through 40d may initially have the same diameter as the lowermost turn 35 of FIG. 4, so that when element 12d and case 11d are positioned as shown in FIG. 10 on fixture 31d, with the bottom turn of element 12d engaging and supported by a helical ramp surface 132d on the fixture, the movement of tapering case lid downwardly onto element 12d will slightly constrict the upper turns 36d through 40d to the desired positions. The brazing material 41d about and between the various turns 35d through 40d may then be fused in an oven to permanently bond turns 35d through 40d in the discussed positions, following which the lowermost turn may be ground off as in the first form of the invention to complete the nut assembly.

It will, of course, be apparent that the number of turns in each of the two portions of the coiled spring element in the various forms of the invention may vary from the numbers illustrated. However, it is desired that the bonded portion consist of at least a plurality (at least two) full turns, and desirably at least about three turns. Also, it is preferred that the unbonded portion consist of at least one full 360 degree turn, and desirably not more than about three full turns (for best results not more than about two full turns). Additionally, it is desirable that the bonded portion include more turns than the unbonded portion, preferably at least about twice as many turns.

As stated previously, a major advantage of the present partially bonded and partially unbonded nut resides in the capacity of the bonded fixed diameter portion to successfully "pull" the unbonded portion onto a mating screw in an axially trailing relation. It has been found in practice that a partially bonded coiled element of this type can be "pulled" onto a screw, i.e. can be advanced onto thet screw without binding by turning force exerted against the leading or axially inner end of the element, whereas a completely unbonded element must be "pushed" onto a screw, by a shoulder acting against its trailing end, to prevent excessive binding.

I claim:

1. A lock nut comprising a case, an elongated thread element of resilient spring material located at least partially within said case, said element being coiled generally helically and having a radially inner portion forming an internal thread for engagement with a mating screw, means forming an essentially helical ramp carried by said case axially inwardly of said thread element for taking axially inward forces therefrom and having a shoulder preventing relative rotation of said element, a plurality of primary turns of said thread element being permanently bonded essentially rigidly to said case, and to one another and to said ramp, said thread element having a locking portion axially outwardly beyond said primary turns in a direction away from said ramp which is deformed to, and normally returns by its own resilience to, a condition in which it deviates from a true helical continuation of any of said primary turns, said locking portion being free of direct rigid attachment to said case and being free for deformation against its resilience by a mating screw from said normal condition and toward closer coincidence with a true helical continuation of said primary turns.

2. A lock nut comprising a case containing a passage, an elongated thread element of resilient spring material located at least partially within said passage in the case, said element being coiled generally helically and having a radially inner portion forming an internal thread for engagement with a mating screw, a plurality of primary turns of said thread element being shaped to essentially fit the screw, said primary turns being permanently bonded to said case and in fixed relative positions and being retained by said bonding against radial expansion or radial constriction or axial shifting movement relative to one another or relative to the case and in positions for load bearing engagement with the screw, said thread element having a locking portion which is deformed to, and normally returns by its own resilience to, a condition in which it deviates from a true helical continuation of said primary turns and has an interference fit with the screw, said locking portion being free of direct bonded attachment of one turn to an adjacent turn or to said case and being free for deformation against its resilience by a mating screw from said normal condition and toward closer coincidence with a true helical continuation of said primary turns to thereby attain a self locking action with the screw.

3. A lock nut as recited in claim 2 in which said locking portion of said thread element resiliently assumes a position of substantially smaller diameter than said primary turns.

4. A lock nut as recited in claim 2, in which successive ones of said primary turns are retained by said bonding essentially rigidly at diameters which decrease very slightly in an axial direction but with the dimensional differences between successive ones of said primary turns being small as compared with the dimensional differences between each of said primary turns and said resiliently deformable locking portion.

5. A lock nut as recited in claim 2, in which said case has an essentially transverse end surface for engaging a work piece, said primary turns terminating at an end turn having a transverse end surface which is essentially flush with said end surface of the case.

6. A lock nut comprising a case containing a passage, an elongated thread element of resilient spring material located at least partially within said passage in the case, said element being coiled generally helically and having a radially inner portion forming an internal thread for engagement with a mating screw, at least three primary turns of said thread element being shaped to essentially fit the screw, said primary turns being permanently bonded essentially rigidly to said case and to one another along the entire circular extent of each such primary turn and being retained by said bonding against radial expansion or radial constriction or axial shifting movement relative to one another or relative to the case and in positions for load bearing engagement with the screw, said thread element having a locking portion of at least one full turn and not more than about three full turns, which is deformed to, and normally returns by its own resilience to, a condition in which it has a substantially smaller internal thread diameter than do said primary turns and has an interference fit with the screw, said locking portion being free of direct rigid bonded attachment to said case or of one turn to an adjacent turn and being free for deformation against its resilience by a mating screw from said normal condition and toward closer coincidence with a true helical continuation of said primary turns to attain a self locking action with the screw, said case having a substantially smooth and essentially axial inner surface of substantially circular cross section closely adjacent to said coiled element and to which said primary turns are bonded, said element and said case having essentially transverse inner end surfaces which are aligned with one another to both engage and bear against a work piece, said primary turns decreasing in diameter in a direction axially toward said locking portion, but to a very slight degree not more than about two thousandths of an inch per turn, and to an extent more uniformly distributing load forces between the turns.

7. A lock nut as recited in claim 6, in which individual turns of said element have radially inwardly tapering thread surfaces on said radially inner portion thereof, and have a radially outer portion which progressively decreases in axial thickness as it advances radially outwardly, the bond between said primary turns including bonding material received axially between and adhered to said radially outer portions of adjacent ones of said primary turns.

8. A lock nut comprising an elongated thread element of resilient spring material coiled generally helically and having a radially inner portion forming an internal thread for engagement with a mating screw, a plurality of primary turns of said thread element being shaped to essentially fit the screw, said primary turns being permanently bonded in essentially fixed relative positions and being retained by said bonding against radial expansion or radial constriction or axial shifting movement relative to one another and in positions for load bearing engagement with the screw, said thread having a locking portion which is deformed to, and normally returns by its own resilience to, a condition in which it deviates from a true helical continuation of any of said primary turns and has an interference fit with the screw, said locking portion being free for deformation against its resilience by a mating screw from said normal condition and toward closer coincidence with a substantially true helical continuation of said primary turns to thereby attain a self locking action with the screw, said thread element having an axially inner end surface disposed transversely of the axis of said thread and exposed for direct engagement with a transverse surface of a work structure.

9. A lock nut as recited in claim 8, including a case disposed about and containing said coiled element and having an internal surface closely adjacent said primary turns which tapers very slightly, said primary turns tapering essentially in correspondence with said internal surface of the case.

References Cited by the Examiner

UNITED STATES PATENTS

| | | | |
|---|---|---|---|
| 964,062 | 7/1910 | Seddon | 151—14 |
| 2,279,574 | 4/1942 | Langmaid | 151—41.76 |
| 2,363,663 | 11/1944 | Findley | 85—32 |
| 2,387,257 | 10/1945 | Haas | 85—32 |
| 2,407,879 | 9/1946 | Haas | 85—32 |
| 2,439,687 | 4/1948 | Findley | 85—32 |

FOREIGN PATENTS

| | | |
|---|---|---|
| 550,445 | 1/1943 | Great Britain. |
| 857,495 | 12/1960 | Great Britain. |

CARL W. TOMLIN, *Primary Examiner.*

M. PARSONS, JR., *Assistant Examiner.*